July 4, 1933.  W. A. KINGSBURY  1,916,269
APPARATUS FOR TREATING AND PEELING FRUITS
Filed June 6, 1928  9 Sheets-Sheet 5

July 4, 1933.  W. A. KINGSBURY  1,916,269
APPARATUS FOR TREATING AND PEELING FRUITS
Filed June 6, 1928　　9 Sheets-Sheet 6
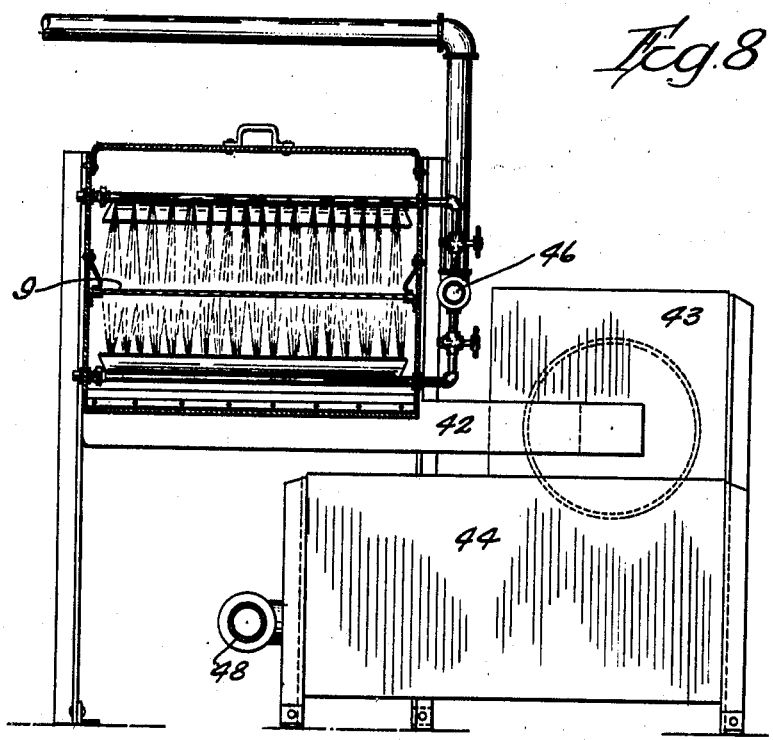
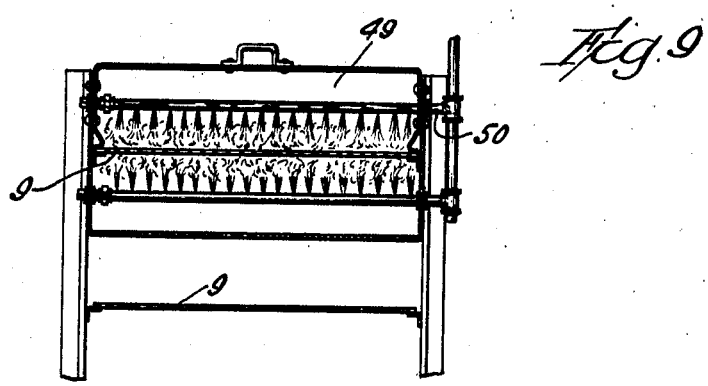

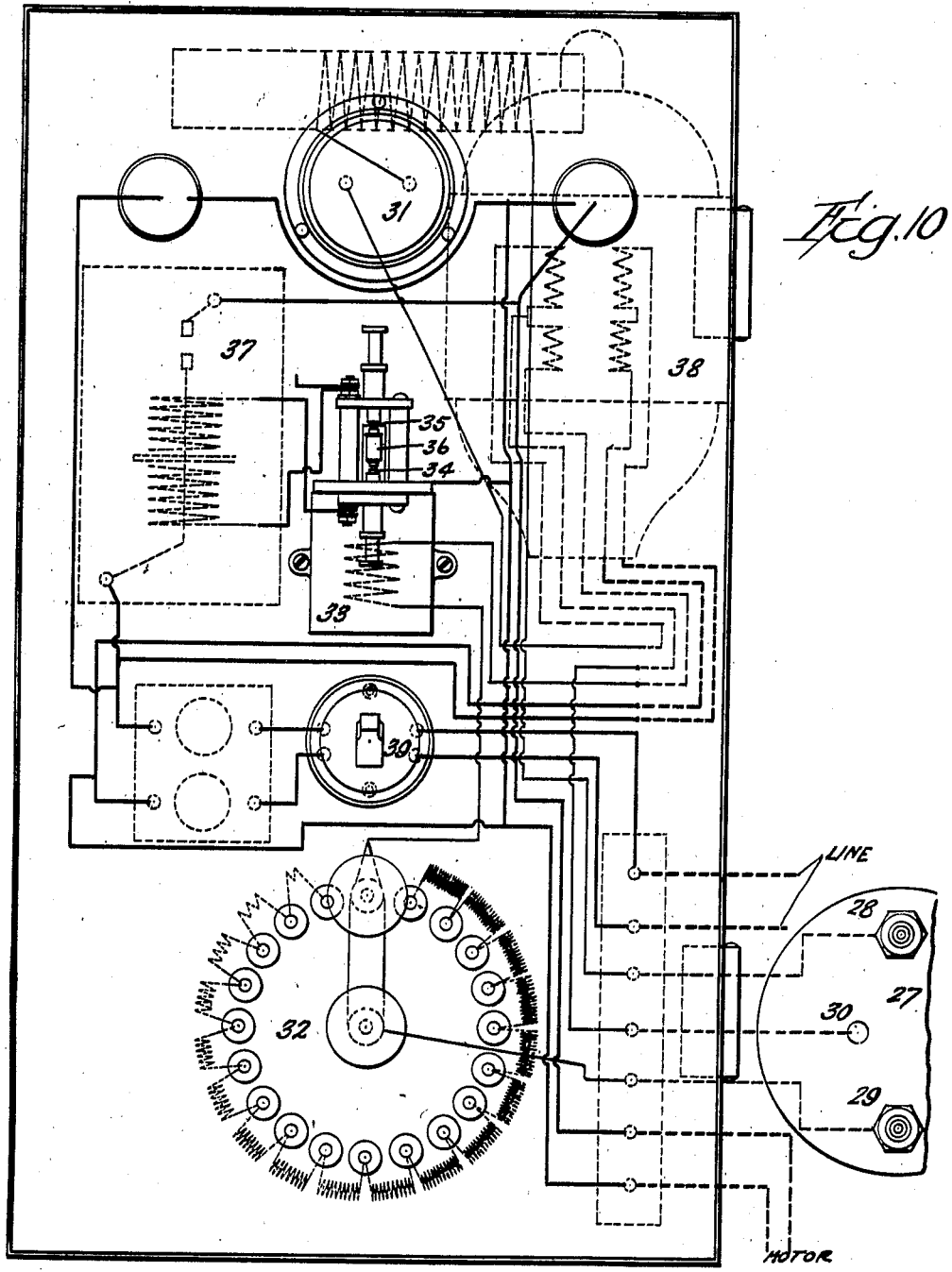

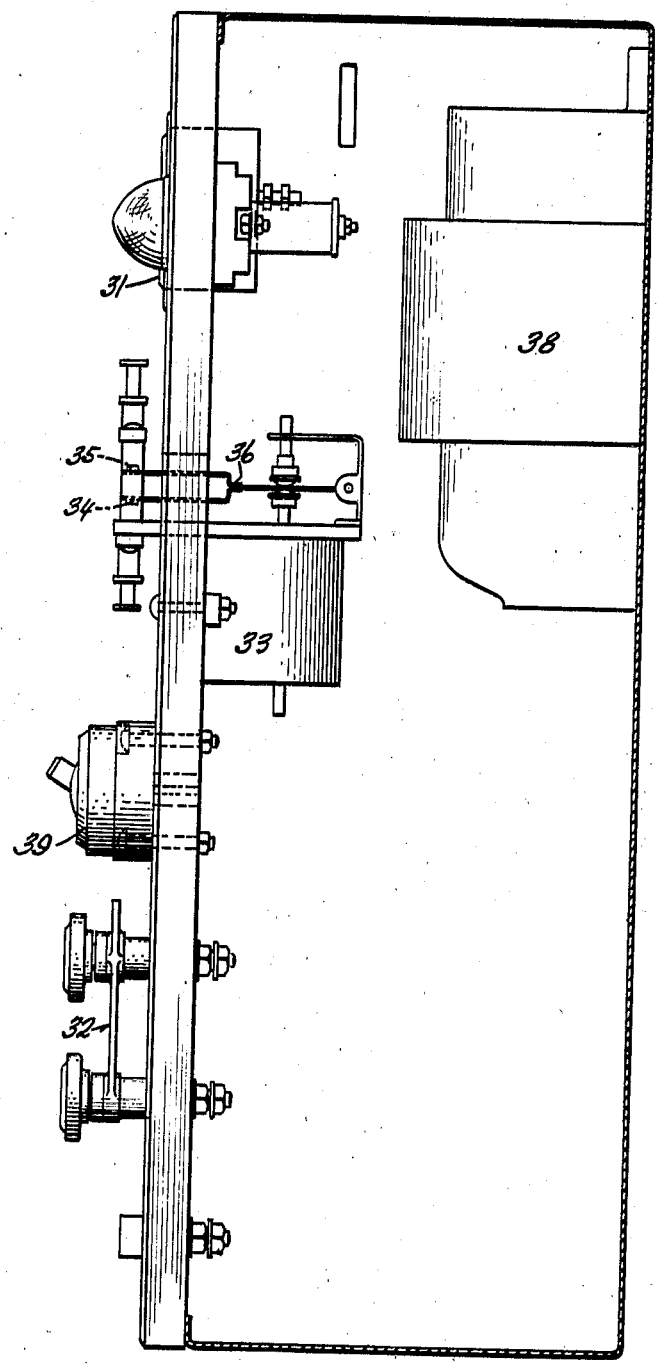

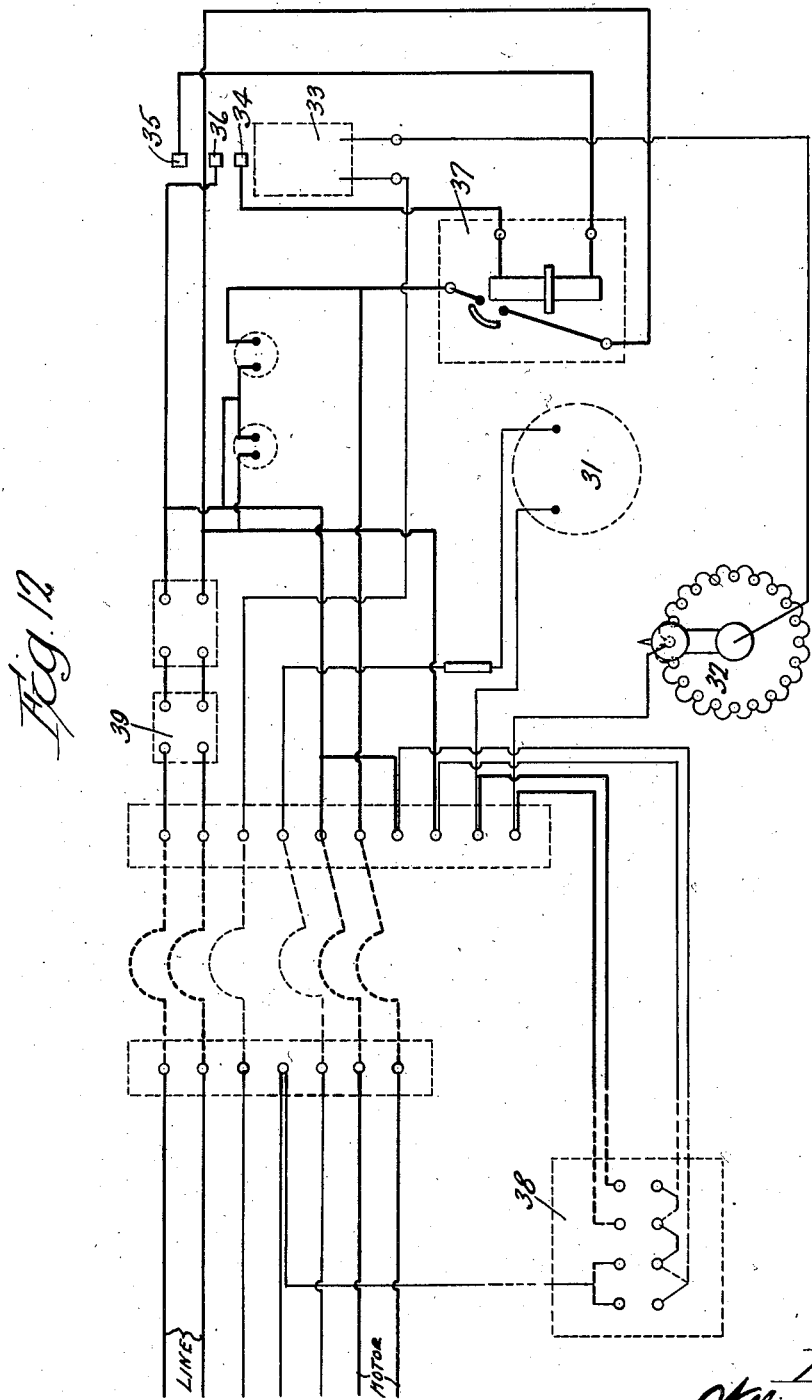

Patented July 4, 1933

1,916,269

UNITED STATES PATENT OFFICE

WILLIAM A. KINGSBURY, OF HAYWARD, CALIFORNIA, ASSIGNOR TO SPRAGUE SELLS CORPORATION, OF HOOPESTON, ILLINOIS

APPARATUS FOR TREATING AND PEELING FRUITS

Application filed June 6, 1928. Serial No. 283,241.

This invention relates to a method and apparatus for peeling fruits and vegetables by means of the application of heated disintegrating solutions in a particular manner together with electrical means for controlling the density and temperature of the solutions, and also with means controlled by said electrical means for circulating said solutions through the various and several channels necessary to the practicing of the invention.

A brief outline of past and some present methods of peeling fruits and vegetables by the disintegrating process will aid materially in understanding the merits of this invention.

The two principal methods of operation have included either the immersion of the fruit or vegetables in a disintegrating solution for a sufficient time, or spraying the solution over the material being treated by means of suitable spray nozzles.

Both of these methods of applying the solutions to the surfaces of the fruits have developed certain disadvantages that my present invention obviates.

When the fruits or vegetables are delivered to the cannery they are usually in varying stages of ripeness, some are very ripe and will release their skins much quicker and easier than those that are greener or less ripe and more solid.

When a mixed mass of fruit is immersed in a disintegrating solution, the heated solution will penetrate the skins of the ripe fruit much quicker than the skins of the green fruit, or that less ripe, it is necessary, however, to immerse long enough to thoroughly disintegrate the skins of the least ripe of the mass and in so doing invariably the ripest fruit is somewhat overtreated so that the contact of the strong solution attacks the pulp of the fruit with a considerable loss of good material which is eaten away.

Applying the disintegrating solution by means of sprays is also at times disadvantageous for substantially the same reasons as well as additional faults. To properly apply a spray and have it contact or cover the entire surface of the fruit it is usually necessary to agitate the fruit during the spraying operation in order to present the entire surface of each fruit to the spray. This agitation jostles the fruits together and more or less bruises those that are fully ripe and does not always cover evenly and uniformly. The spray jets must also be projected with some force in order to deliver the solution fast enough to cover properly as the fruit moves along adjacent the spray nozzles. This projection of the hot solution against the surfaces of the fruit penetrates the skins of the very ripe fruits much faster than it does the skins of the less ripe with the result that the ripe fruits are more or less pitted just under the skins after the skins are washed off, thus wasting good material and giving a degraded look to the product.

My improved method and apparatus is designed to overcome these and other attending difficulties connected with the removal of fruit and vegetable skins by the disintegrating process, principally through the improved method of applying the disintegrating solution in the form of a thin sheet so applied that each individual fruit is quickly and gently enveloped in a thin film of solution of uniform density and temperature and in just the desired quantity to perform the operation with the least loss of material. The application of the solution by this method contemplates intermittent steps of sufficient number and frequency so that each fruit of the mass will be completely covered with the desired film to remove or disintegrate the skin in the prescribed time for passing through the machine.

In this manner just sufficient solution is applied to disintegrate the skins but not enough, or in a manner, to degrade the product. Where only a thin film is applied the desired amount can be nicely regulated so that the film will have just strength enough to disintegrate the tough skins but will not hold its strength long enough to injure the pulp of the very ripe fruits. It being understood that contact with the previously heated and wetted fruits has a tendency to dilute the solution somewhat, and since it is present only in a thin film the whole body of the film is more or less quickly diluted and through its disintegrating action on the skins its strength is further dissipated so that at no time by this improved method of application is there a body of strong solution in contact with the fruit after the skins are fully or almost disintegrated.

It has been found by actual experiment under canning factory conditions that the action of an originally strong solution can be most easily and nicely controlled simply by repeated intermittent applications frequent enough to insure complete and uniform coverage. A thorough coverage followed by passing the coated fruit through a heated chamber to permit the film to take effect will usually completely disintegrate the skins for later easy removal and so dissipate the strength of the remaining solution that it will not injure the pulp.

It is therefore a principal object of the invention to apply a disintegrating solution to the skins of fruits and vegetables in a thin film for the purpose of a preliminary loosening of the skins for subsequent removal.

It is also a principal object of the invention to apply a disintegrating solution to the skins of fruits and vegetables intermittently for the purpose of a preliminary loosening of the skins for subsequent removal.

It is also an object of the invention to cause the disintegrating solution to fall or flow in a thin film onto the product in a very gentle manner so as to cover completely.

It is also an object of the invention to apply a disintegrating solution in a thin film to a mass of fruit or vegetables and then subjecting the treated mass to heat to assist the disintegrating action.

It is also an object of the invention to provide an apparatus for applying a thin film of disintegrating solution to the surfaces of fruits and vegetables for removing the skins therefrom, said film being applied in a continuous stream as a mass of material is passed thereunder.

It is also an object of the invention to apply a plurality of thin streams of disintegrating material to a mass of material as it is moved thereunder.

It is also an object of the invention to arrange a plurality of applying means so that a mass of material to be treated will receive a plurality of intermittent treatments during its passage through the machine.

It is also an object of the invention to provide means for supplying a continuous stream of solution that is used, clarified and used over again and strengthened at intervals so that the same body of solution may be used to treat a continuously moving mass of new material.

It is also an object of the invention to provide automatic means for controlling the density of the solution to keep it up to a uniform standard of strength.

It is also an object of the invention to provide automatically operated electric means for controlling the density of the solution.

It is also an object of the invention to provide means for discharging disintegrating solution in a thin film or stream and divert it by means of baffle plates so that it falls most gently onto the line of moving fruit to be treated.

It is also an object of the invention to provide means for warming and preheating a mass of fruit and then passing it into the zone of a thin stream of disintegrating solution.

It is also an object of the invention to provide means for pretreating a mass of fruit or vegetables including heat, then passing the mass through a stream of disintegrating solution that gently covers the mass with a thin film then passing the mass through a heating chamber to permit the solution to take effect.

It is also an object of the invention to provide means for controlling the density of the solution comprising separated electrical contacts immersed in the solution and the control of current flow there across being governed by the greater or less resistance present in a varying solution.

It is also an object of the invention to provide electrical means for controlling the density of solutions comprising a rheostat for controlling the maximum current that may flow over a circuit having separated contacts immersed in the solution.

It is also an object of the invention to provide means for preheating and wetting a mass of fruit; applying a film of disintegrating solution; applying heat to the mass while covered with the solution then subjecting the mass to the action of sprays to remove the disintegrated skins.

With such object in view as well as other advantages inherent in the invention, the novel structural peculiarities, novel organization of parts and the separate and collective operations involved in carrying out the recited objects of my invention, which will be made the subject matter of claims hereto appended, I wish it understood that the several necessary elements and combinations constituting the same may be varied in their proportions, placement, general arrangement and operative relation without departing from the nature and scope of the invention. In carrying out the objects of the invention in a concrete form or machine, further objects, advantages and improvements have been evolved than have been recited, and in order to make the invention more clearly understood there are shown in the accompanying drawings means and mechanism embodying the preferred structural arrangement of the different parts and combinations, in which I have simply embodied the creative part or concept of the invention. The described devices are simply embodiments of the invention which other structures might also employ and some of the parts and combinations of parts may be used without the others in different types of such apparatus without departing from the purview of my invention and I regard myself as entitled to such variations from the shown and described devices as fall within the scope and meaning of the claims.

Reference now being had to the accompanying drawings a clearer and more comprehensive understanding of the invention will be had.

Fig. 1 is a plan of the front or entrance end of an apparatus embodying my invention. Here is shown the conveyor on which the material to be treated is placed by being dumped into the hopper shaped opening, just in advance of this is the preheating section followed directly by the lye section where the disintegrating solution is applied in intermittent steps to the stream of advancing material on the conveyor. A portion of the cover over the lye section is broken away to show a plan of one of the elements for applying the solution. At the lower side of this view will be seen certain mechanism for circulating the medium and at the top of the view is seen the pressure heater tank.

Fig. 2 is a continuation of Fig. 1 extending from the right thereof. This view shows the water spray section of the apparatus and the pipe connections thereto together with the mechanism for circulating the spray water for removing the disintegrated skins. At the top of the view is seen a booster pump for increasing the pressure if desirable.

Figure 1:
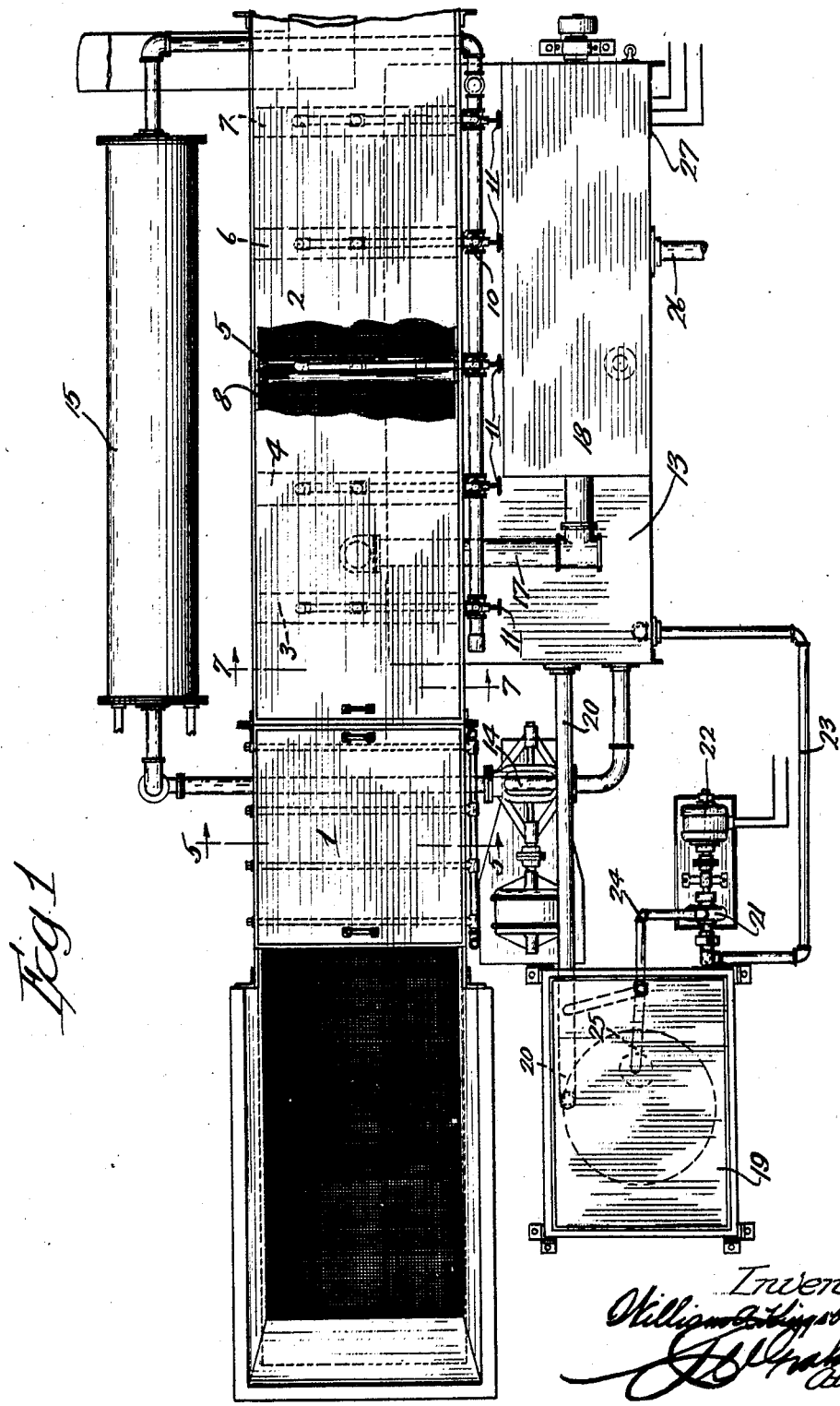
Figure 5:
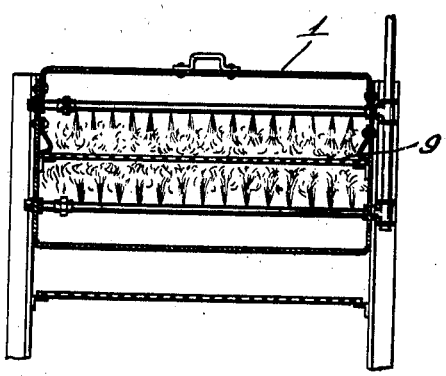

Fig. 5 is a cross section of the preheating section taken on approximately the line 5 of Fig. 1. Here is seen the arrangement of the steam pipes and jets relative to the conveyor that carries the product through the machine. It is seen that the steam or other heating element is projected from both the top and bottom of the chamber so that substantially all of the mass of material is acted on by the sprays while the conveyor moves between the upper and lower sprays.

Figure 6:
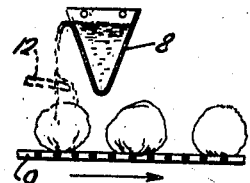

Fig. 6 is an enlarged detail view of one of the troughs located in the lye section and may for purpose of illustration be the one shown in full lines in the broken away space in Fig. 1. It is seen that one edge of the solution or lye trough is lower than the other and that it is curled and has a drip edge over which the solution flows in an even continuous film and drops very gently onto each of the fruits of the mass being carried along by the conveyor. I have indicated by dotted lines how baffle plates may be placed just over the surface of the fruits to intercept the falling stream of solution and further break its force and pass it more gently onto the fruit which condition may be desirable with very ripe and soft product. The baffle of course may be tilted to deliver the solution from either side.

Figure 7:
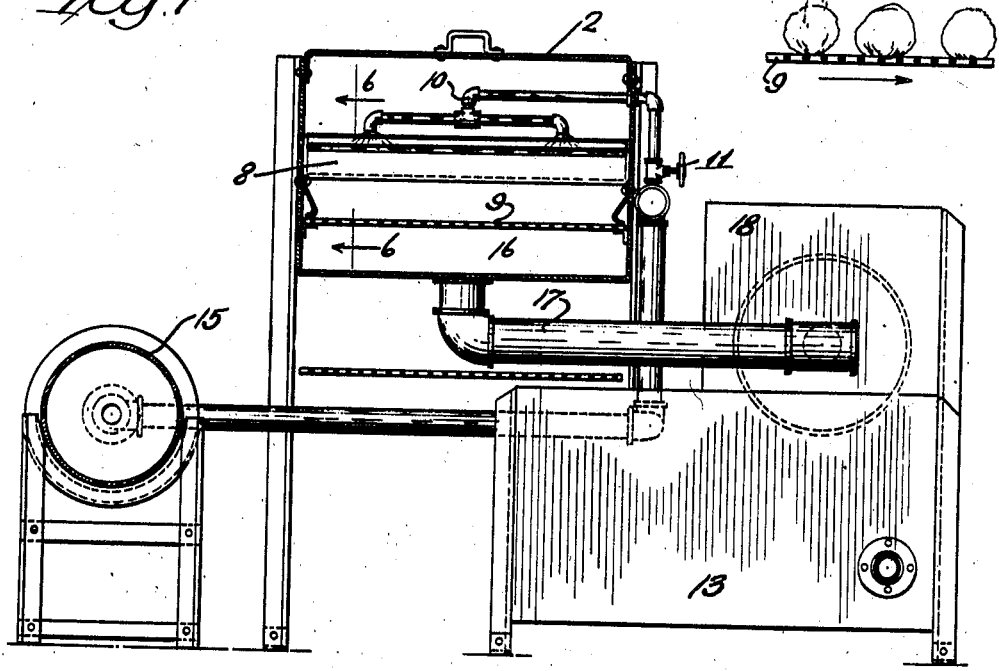

Fig. 7 is a vertical sectional elevation taken on approximately the line 7—7 of Fig. 1 and shows the side elevation of one of the solution troughs with the attending piping; conveyor; drain pipe for recirculating the solution; pump for delivering the solution to the trough; the general arrangement of the casing and other parts.

Figure 2:
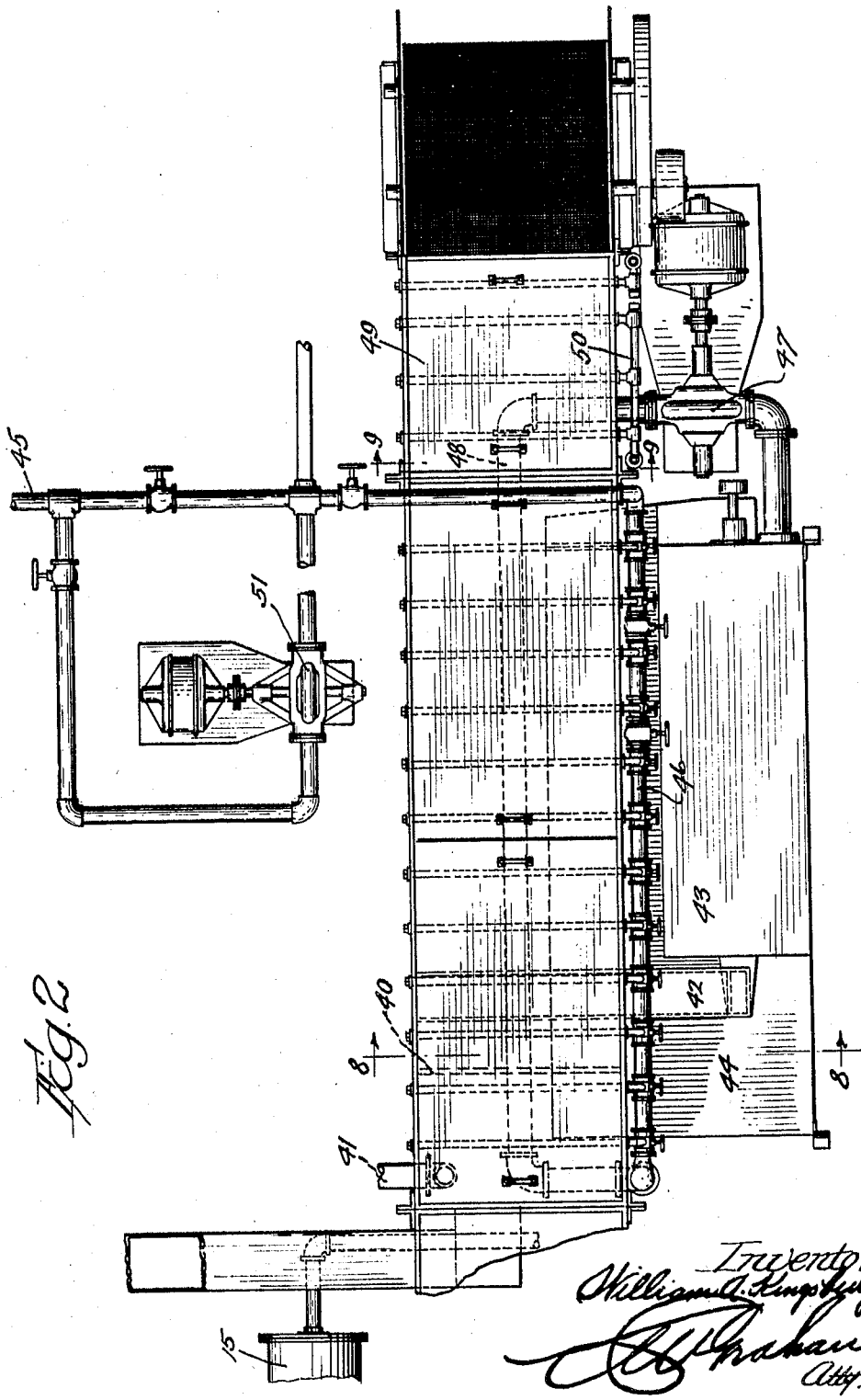

Fig. 8 is a vertical cross section taken on approximately the line 8—8 of Fig. 2 and shows the arrangement of the water section where water sprays are directed onto the disintegrated product being carried forward by the conveyor to wash off the loosened skins. Here again the sprays are directed from both the top and bottom so that the loosened skins will be effectively washed away from the fruit and fall down to the bottom of the casing where the flow of water will carry them through a conduit into the separating and clarifying chamber where the water is cleaned and repumped to the sprays for further duty.

Fig. 9 is a vertical cross sectional elevation taken on approximately the line 9—9 of Fig. 2 and shows an elevation of the blanching section where the peeled fruit is subjected to the action of steam sprays for a short time in a similar manner to the preheating section. At the end of this blanching section the fruit is again subjected to cold water sprays to cool the product so it can be handled.

Fig. 10 is a plan of the electrical instrument box in somewhat diagrammatic layout to clearly show the wiring and the general arrangement of the various instruments comprising this unit.

Fig. 11 is a side view of the box of Fig. 10 showing the location of the several instruments from this angle, the wiring being omitted for clarity.

Fig. 12 is a further wiring diagram which will be referred to in more detail in the body of the description.

The improvements embodied in this application have been applied to a machine or apparatus such as is disclosed in the Dunkley Patent 1,427,270, issued to S. J. Dunkley August 29, 1922, on Peeling apparatus and process. The improvements being applied to this type of machine it may not be necessary to go into every detail of construction and operation except where the actual improvements are involved separately or in combination, since much of the construction and operation is fully described in the above patent.

The method part of this application involves the particular manner of applying the disintegrating solution to the surfaces of the fruit or vegetables being treated, which in practice has proven to be a very much desired improvement over other known methods of treatment.

The apparatus part of the invention comprises the means for applying the disintegrating solution in the new way; newly devised means for controlling the density of the solution which includes electrical devices that are automatically operated through a variation of density of the solution as it is being used, recirculated, clarified and reused all of which will be fully described as illustrated in the accompanying drawings.

The apparatus used to illustrate this invention may be divided into substantially four main sections.

A pre-heating section is provided through which the fruit passes wherein it is subjected to the action of steam jets from above and below the metal belt on which it rests and is being carried. The purpose of this preheating is to thoroughly warm and wet fruit that may have been brought from cold storage, or if applied to fruit of normal temperature the pre-heating and wetting aids very materially in getting a film of disintegrating solution evenly distributed over the surfaces of the individual fruits in the following operation. A further advantage in this preheating operation resides in having the fruit surface wet when the disintegrating solution is applied is that the wet surface permits the lye solution to quickly cover the wet surface completely and not in spots as may be the case when it is applied to a dry surface. The pre-heated wet surface also conserves the heat of the lye solution so that none of its heat is lost in heating the fruit, therefore its disintegrating action is faster and more perfect and its strength is held more uniform.

The next section or step in the process is the application of the disintegrating solution to the surfaces of the fruit as they are carried along by the metal belt. In this section the lye solution is deposited on the wet pre-heated fruit in the form of a thin film which is deposited in a manner to spread most evenly and completely over the entire surfaces of the fruit. This exact manner will be described later.

In the depositing of this thin film of lye solution I have provided means for a plurality of intermittent applications to be applied successively as may be necessary in the treatment of various kinds of fruits and vegetables, each requiring a slightly different treatment as to number of applications to get complete coverage. This lye section of the apparatus also includes a heating space through which the coated material is passed while the lye solution is acting on the skins to loosen and disintegrate them.

The next section of the apparatus is the water section where the product is subjected to water sprays directed against the loosened and disintegrated skins to wash them away. Here also the sprays are directed against the fruit from above and below so that all surface will be reached and the loosened skins washed away.

The next section is the blancher section where the peeled product is subjected to the action of steam jets similar to the pre-heating section. The purpose of this operation is to improve the appearance and firmness of the fruit. From this treatment it passes under cold water sprays to cool it so it may be handled conveniently.

The pre-heating section comprises the part indicated by the numeral 1 of Fig. 1 and is the short section covered by the two handled cover shown. See also Fig. 3.

Figure 3:
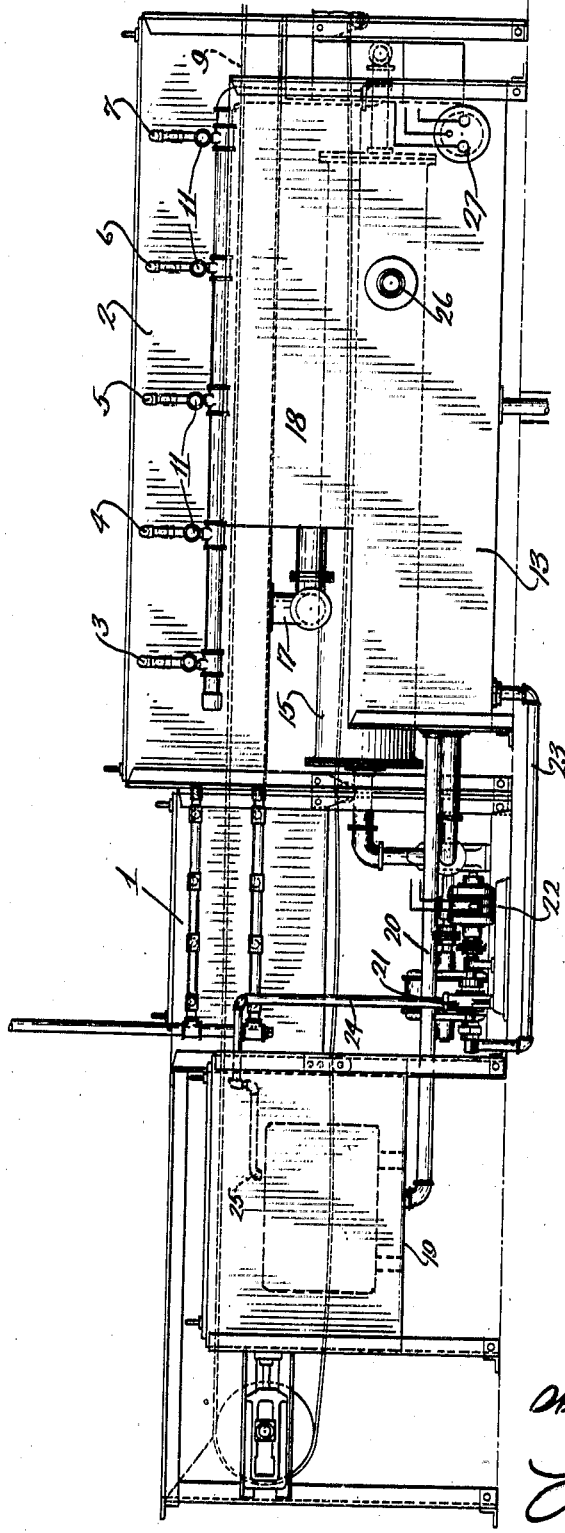
Fig. 3 is a side elevaton of Fig. 1 showing the several parts of the apparatus in side elevation. The lower right hand end of this view shows the electrical contacts that are immersed in the solution for controlling the density.

The lye section comprises all of the balance of the apparatus extending to the right of Fig. 1 and Fig. 3 indicated by the numeral 2. Since the application of the lye solution to the product is one of the main features of this invention I will follow now with a detailed description of it.

Referring to Figs. 1, 2, 3, 6 and 7. In Figs. 1, 2 and 3 I have illustrated five solution applying stations indicated by the numerals 3, 4, 5, 6 and 7. In Fig. 1 station 5 is shown in plan view. Each applying station comprises a trough 8 seen best in Figs. 6 and 7, located just above the path of travel of the metal conveyor belt 9 and with its lower part just clearing the fruit as it passes. The troughs 8 have one vertical side terminating in a curled edge over which the solution overflows in a thin film and gently falls on the passing fruit. The supply pipes and valves, 10 and 11, supply and control the amount of solution flowing into each trough to maintain the film constant, the amount of supply determining the thickness of the film overflowing. The pre-heating and wetting of the fruit before the solution is applied supplies a surface condition on the fruit that permits the falling film of lye to completely envelop the fruit and flow all over the surface as soon as it contacts therewith. The instant the lye solution touches the skin of the fruit it begins its disintegrating action and one application may be enough for some delicate skinned products.

Other fruits or product may require the entire five applications to get enough solution on the skins to effect complete disintegration so they will be easily washed away in the subsequent operation. By supplying five stations it is thought sufficient space has been provided to care for any possible conditions and sufficient to disintegrate the toughest skins. It is understood, however that as many applications may be provided as may be desirable to satisfy some unusual conditions.

On some delicate skinned fruits the force of the gently falling film from the curved lip of the trough 8 may be too severe. In order to modify the slight force of the falling film a baffle plate 12 may be placed just over the fruits and the solution intercepted by this plate will have its fall so reduced that in running off the plate onto the surfaces of the fruit there will be practically no force or impact imparted to the fruit and the film coverage will be just as perfect and effective. By providing the multiple stations for applying the solution, and controlling the quantity supplied to the troughs any desired amount of lye can be applied to the skins of the moving mass of material and thereby give proper and effective treatment to any product.

A supply of lye solution is carried in the tank 13, is drawn from this tank by the circulating pump 14; delivered to the pressure heater tank 15 and from there passes to the several troughs 8 through the system of piping shown. As the solution washes over the fruit in falling from the troughs 8 the surplus drops into the bottom of the casing 16, Fig. 7, passes into the drain pipe 17 and into the rotary screen 18 where it is screened and clarified and then passes back into the storage tank 13 and is used over and over so that the only loss of solution is what adheres to the fruits during the overflow from the troughs 8. The solution is maintained at a constant or substantially constant temperature around 208 to 212 degrees Fahrenheit by means of steam coils in the pressure heater tank.

The question now arises as to maintaining a sufficient supply of proper strength solution in the tank 13 and circulating system so as to keep the troughs constantly supplied with proper strength solutions. I have provided an automatically controlled electrical system for caring for this important feature of my invention. I will first describe the lye storage, circulating pump and connections between the lye storage and the main supply tank 13 and the apparatus that automatically brings this into action when the density of the solution varies and will then follow with a detail description of the actual electrical devices that control and operate this mechanism.

In Figs. 1 and 3 will be found a tank 19 somewhat elevated above the main supply tank 13.

In Figs. 1 and 3 will be found a tank 19 somewhat elevated above the main supply tank 13 and with a gravity drain pipe 20 connecting the two tanks. A circulating pump 21 driven by a motor 22, draws solution from the tank 13 through the pipe 23 and delivers the solution to the lye tank 19 through the pipe 24 carried to the top of the tank. A swinging nozzle 25 connects with pipe 24 and delivers the solution into the top of a drum of caustic soda, the solution falling into the top and on the soda will absorb some of the soda and overflow over the drum and flow back to the main tank 13 through the gravity drain 20. This circulation is continued until the strength of the solution in the main tank 13 is sufficient for the purpose. Water must be supplied at intervals to the tank 13 by means of the water supply pipe 26. When the density of the solution in the tank 13 has increased to the desired amount the motor 22 is automatically stopped and the circulation of the solution through the lye tank 19 stops until such time as the density again falls below the desired standard when the above described operation is repeated.

The control apparatus for indicating when the solution is becoming too weak to properly treat the fruit skins comprises an electrical apparatus which I will now describe.

In Figs. 1 and 3 will be seen a spark plug plate 27 secured to the lower right hand corner of the supply tank 13. This plate 27 carries two ordinary type spark plugs with separated points immersed in the solution in the tank 13. The indication of density of the solution in the tank 13 is determined through the resistance of the solution to the flow of current between the terminals of the spark plugs. A normal density solution permitting a certain flow of current, which as long as constant, maintains certain operative conditions in the electrical system. As soon as the density recedes through use of solution and addition of water the resistance increases between the spark plug points and therefore less current can flow which immediately brings about a change in the electrical equilibrium. This change operates a relay switch which starts the motor 22 and begins a circulation of the solution from the tank 13 through the lye tank 19 and thus continues until the normal density is again established in the tank 13 when the normal equilibrium of the electrical apparatus is again established through a normal flow of current between the spark plug points in the solution in the tank 13.

Fig. 10 gives a diagrammatic layout of the circuit arrangement and the instruments required to accomplish the results just described. 27 represents the spark plug plate referred to as being attached to the side of the tank 13. Plug 28 is an ammeter plug and leads to the ammeter 31 thus indicating at all times by visual observation the exact condition of the solution in the tank 13.

Plug 29 leads to a variable rheostat 32 which can be set to permit a desired normal flow of current through the spark plug points 29 when the density of the solution is normal, the circuit continuing from the rheostat 32 to a balanced master coil 33 which controls the movement of the contacts 34 and 35. This master coil 33 requires a certain constant current to hold it in neutral position with neither of the contacts 34 or 35 closed, or stating it more properly it requires a constant current of certain strength to hold the movable contact member 36 in a neutral position with both the contacts 34 and 35 open. This constant necessary current is permitted to flow when the solution is of such density that the necessary volume of current can pass between the points of the spark plug 29. Just as soon as the density of the solution in the tank 13 drops, the resistance between the spark plug points increases thus reducing the flow of current with the result that the balance of the master coil mechanism is disturbed, which in turn closes one of the contacts 34 or 35, depending on how the wiring is run, which directs current through a flip flop relay switch 37 which is thereby operated directing current to the motor 22 which immediately begins circulating solution from the tank 13 through the lye supply tank 19 to strengthen the solution. When the solution has again been brought up to proper strength the added flow of current permitted on account of the reduction of resistance between the points of the spark plug 29 will increase the flow of current through the master coil 33, temporarily closing the contacts 35, directing current through the relay switch 37 thus breaking the circuit to the motor 22 and stopping the circulation.

The excess flow of current permitting the operation of the relay switch to stop the motor is only momentary, the flow will promptly balance the master coil mechanism and hold the contacts 34 and 35 open until such further time that the density of the solution drops when the described procedure will be repeated. The contact 30 on the spark plug plate is a common ground connection. 38 represents a transformer for admitting ordinary line current to the control apparatus. 39 is a switch for connecting the control apparatus with the line current.

Figure 4:
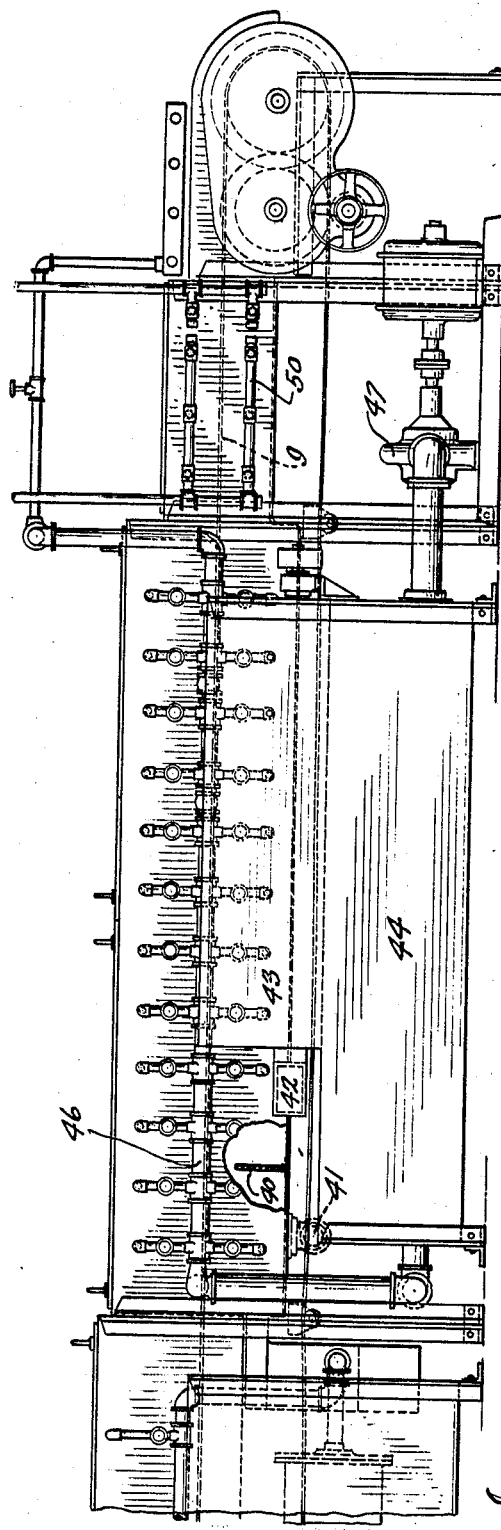
Fig. 4 is a side elevation of Fig. 2 and shows the various elements of this end of the apparatus in side view.

Passing now to the water section of the apparatus, see Figs. 2, 4 and 8. Referring first to Fig. 4 will be seen what is termed a dam, 40, placed in the front end of this section. The first two water sprays just following the lye section will remove substantially all of the loosened skins from the fruit, these removed skins and the water effecting the removal drop into the section at the left of the dam 40 and pass to the factory drain through the pipe 41.

After the mass of product passes the dam all of the water and remaining skins or other refuse fall to the right of the dam and flow by gravity through the conduit 42 into the screening chamber 43 where the refuse is screened out of the water which then passes into the water tank 44 and is used again.

Fresh water is brought into the apparatus through the main 45 to one end of the header pipe 46 and the water from the tank 44 is drawn by the pump 47 and delivered to the other end of the header pipe 46 through the pipe 48.

At the rear of the apparatus is the blancher section 49 supplied with steam through the pipes 50, a section of the arrangement being seen in Fig. 9.

It sometimes happens that not enough pressure is supplied from the main water supply through the main 45. When this condition arises the water is shunted through the booster pump 51 which can increase the pressure to any desired amount.

*Operation*

The detail description of the several sections constituting the apparatus of this application have been fully described so that a brief description of the operation will be sufficient.

The fruit or vegetables or other product to be treated is placed in bulk into the hopper surrounding the metal conveyor at the left of Fig. 1. Here it is leveled out over the conveyor and passes first into the pre-heating chamber 1 where live steam is projected onto the material from above and below. There are two main reasons for the preliminary treatment. First, to warm such fruits or other product that may have been kept in cold storage and, second, to thoroughly wet the surface of the fruits so the following application of solution will adhere quickly and flow over the surface easily. Passing from the pre-heating chamber the material is carried under a series of troughs arranged just over the product with just enough space for it to pass. These troughs are supplied from suitable piping with disintegrating lye solution, enough is carried to the troughs to cause a constant overflow over one edge specially prepared to direct the flow in a thin film of solution. As the fruit is slowly carried through these falling films of solution it is spread quite evenly and uniformly over each individual fruit, and owing to the previous heating and wetting the surfaces are quite receptive and absorb the solution readily. This solution being heated to approximately the boiling point of water acts as a heat supply to heat the chamber in which the solution is applied.

It is seldom that all of the troughs will be used in treating any product used by canners, usually two or three are ample. The apparatus has been made long enough, however, to provide for any contingency. In view of this the last end of the lye section can be used for a heating chamber to assist the lye to take quick effect on the skins, and this proves to be a very appreciable assistance.

Passing now to the water section, the product immediately passes under cold water jets applied with enough pressure to thoroughly remove the skins during the first few feet of travel. This first water and the skins are trapped by a dam and are carried out by the drain, the balance of the water applied to the product during its travel through the water section removes any adhering skins and thoroughly washes the lye solution from the peeled fruit. This water and slight residue is carried to a screening chamber where the refuse is separated and passed to the drain while the cleaned water is returned to the supply tank for reuse.

In order to improve the appearance and firmness of the peeled product it is now passed through a blanching section where it is subjected to the action of steam jets for a short period, in much the same manner as in the pre-heating section at the beginning of the process. Immediately the blanched product passes from the blanching chamber it encounters sprays of cold water to cool it sufficiently for easy and convenient handling.

This practically completes the operation when applied to apparatus such as I have shown.

Having thus described my invention what I claim as new and desire to cover by Letters Patent is:

1. An apparatus for peeling fruits or the like comprising a series of closed bottom receptacles, means for supplying solution to said receptacles to cause an overflow therefrom, the overflow being free of hydrostatic or head pressure, and being substantially a continuous thin film, means for passing fruit or the like through said overflow to receive successive coatings of solution, means for then directing a solution against said fruits to remove the skins.

2. An apparatus for treating the skins of fruits for easy removal comprising a plurality of closed bottom receptacles for carrying separate supplies of disintegrating solution, means for supplying solution to said receptacles and cause the same to overflow therefrom, the overflow being free of hydrostatic or head pressure, and being substantially a continuous thin film, means for passing fruit through the overflow from said receptacles to receive successive coatings of solution, means for spraying said fruit after the skins have become disintegrated.

3. An apparatus for treating the skins of fruits for easy removal comprising means for moving a mass of fruit through a predetermined path, a pre-heating and wetting chamber, a plurality of closed bottom disintegrating solution receptacles, means for supplying solution to said receptacles to cause an overflow therefrom free of hydrostatic or head pressure, and being substantially a continuous thin film whereby the passing fruit will receive successive coatings of solution, means for applying a liquid spray to said coated fruit after the skins have become disintegrated.

4. An apparatus for treating the skins of fruit for easy removal comprising means for moving a mass of fruit over a predetermined path, means for applying steam to the surfaces of fruit, a plurality of closed bottom disintegrating solution receptacles, means for supplying heated solution to said receptacles to cause an overflow therefrom free of hydrostatic or head pressure and being substantially a continuous thin film whereby the passing fruit will receive successive coatings of solution, means for again applying heat to the coated fruit to assist the disintegrating action, and means for spraying cold water on the fruit to remove the skins.

5. An apparatus for treating the skins of fruit for easy removal comprising means for moving a mass of fruit, means for pre-heating and wetting the surfaces of said fruit, a plurality of closed bottom solution receptacles with means for supplying solution to said receptacles to cause an overflow therefrom, free of hydrostatic or head pressure and being substantially a continuous thin film, means for moving said mass of preheated fruit successively through the several overflows from said receptacles to apply to said mass successive coatings of solution, then after the solution has disintegrated the skins means for applying cold water to remove the skins therefrom.

6. In a disintegrating apparatus for the washing and peeling of fruits or vegetables comprising the use of one or more troughs with one edge lower than the other so that a substantially continuous unbroken sheet or film of disintegrating solution is caused to fall or flow down over the product as it passes underneath the trough, with means for moving a mass of product through said film of disintegrating solution.

7. In a disintegrating apparatus for the washing and peeling of fruits or vegetables, means for causing a substantially continuous unbroken flow of disintegrating solution, means for moving fruits into contact with said solution, baffle plates arranged to intercept the solution and cause it to flow gently onto the fruit to be disintegrated.

8. Apparatus for treating the skins of fruit for removal thereof consisting of one or more compartments and a conveyor for carrying fruit through said compartments in succession, a closed bottom tank for applying a substantially continuous unbroken thin film of solution to said fruit intermittently, through a controlled overflow a heated compartment for the coated fruit to assist the disintegrating action on the skins and means for spraying the fruit to remove the skins.

9. An apparatus for treating fruits and the like to loosen the skins for removal comprising means for moving a mass of fruit through a predetermined path, a closed bottom tank located over the said path, means for supplying said tank with treating solution, means whereby said solution is moved laterally over one edge of said tank to form a substantially continuous unbroken film of solution which intercepts and envelops said fruit to disintegrate the skins thereof with means for then removing the skins.

10. An apparatus for treating fruits and the like to loosen the skins for removal comprising a plurality of closed bottom tanks arranged to successively treat fruit, means for moving a mass of fruit underneath said closed bottom tanks, means for supplying each tank with a continuous supply of treating solution, means whereby the solution in each tank is given a lateral movement to pass from said tank in a substantially thin unbroken film or sheet each of which separately and individually and successively intercepts and envelops the fruit as it passes, each successive application adding to the one before to completely envelop and wet the fruit as it passes to disintegrate the skins thereof, with spray means for then removing the disintegrated skins.

11. An apparatus for treating fruits and the like to loosen the skins for removal comprising means for moving a mass of fruit through a predetermined path, a closed bottom tank located over said moving fruit, means for supplying said tank with a continuous supply of solution, means for discharging said solution from the top of said tank so that there is no head or hydrostatic pressure applied to the discharged solution and means intercepting and directing the said d'scharged solution onto the passing fruit to disintegrate the skins thereof with liquid means for then removing the disintegrated skins.

12. A device for delivering a thin continuous substantially unbroken film of fruit treating solution comprising a closed bottom tank arranged adjacent fruit to be treated, means for supplying a continuous stream of solution to said tank, means for moving the solution laterally from the top of said tank over an edge thereof to produce the said thin unbroken film and directing said film to said fruit to envelop the same and disintegrate the skin thereof, with liquid means for then removing said skin.

13. An apparatus for treating fruits to permit easy removal of the skins comprising means for moving a mass of fruit through a predetermined path, a tank having a closed bottom located over said path, and having a lip across the path for converting a supply of disintegrating solution into a continuously moving substantially unbroken film having neither hydrostatic or head pressure to intercept the mass of moving fruit and contact therewith to coat the same, spray means for then removing the disintegrated skins.

14. An apparatus for treating the skins of fruits or the like for easy removal comprising a closed bottom receptacle for a supply of d'sintegrating solution, means for supplying solution to said receptacle and cause the same to overflow therefrom without hydrostatic or head pressure, means for moving fruit through the said overflow to receive a coating therefrom and means for then spraying the fruit after the skins have become loosened and disintegrated.

In testimony whereof I affix my signature.

WILLIAM A. KINGSBURY